United States Patent
Germain et al.

(10) Patent No.: US 6,520,510 B1
(45) Date of Patent: Feb. 18, 2003

(54) VEHICLE ROLL CONTROL SYSTEM

(75) Inventors: Philippe Germain, Montreuil (FR); Robin Oakley, Trumilly (FR); David Burke, Fresnoy en Thelle (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/721,459

(22) Filed: Nov. 22, 2000

(30) Foreign Application Priority Data

Nov. 26, 1999 (GB) .............................................. 9927933
Mar. 10, 2000 (GB) .............................................. 0005745

(51) Int. Cl.$^7$ ......................................... B60G 21/055
(52) U.S. Cl. ............................ 280/5.511; 280/124.106; 280/124.157
(58) Field of Search .......................... 280/5.504, 5.505, 280/5.506, 5.507, 5.508, 5.509, 5.51, 5.511, 5.512, 6.154, 6.157, 124.157, 124.16, 124.161, 124.106; 267/191, 64.16

(56) References Cited

U.S. PATENT DOCUMENTS

| | | | |
|---|---|---|---|
| 4,613,153 A | * | 9/1986 | Shibahata et al. ........ 280/5.507 |
| 4,892,329 A | * | 1/1990 | Kozaki et al. ........ 280/124.149 |
| 4,973,077 A | * | 11/1990 | Kuwayama et al. .. 280/124.104 |
| 4,999,777 A | * | 3/1991 | Schussler et al. ............. 701/38 |
| 5,020,826 A | * | 6/1991 | Stecklein et al. ...... 280/124.159 |
| 5,362,094 A | * | 11/1994 | Jensen ................. 280/124.107 |
| 5,431,431 A | * | 7/1995 | Fulks et al. .............. 280/5.511 |
| 5,529,324 A | * | 6/1996 | Krawczyk et al. .... 280/124.106 |
| 5,627,751 A | * | 5/1997 | Davis et al. .............. 280/5.504 |
| 5,749,596 A | * | 5/1998 | Jensen et al. .......... 280/124.166 |
| 6,179,310 B1 | * | 1/2001 | Clare et al. ........... 280/124.159 |

FOREIGN PATENT DOCUMENTS

| | | |
|---|---|---|
| EP | 0512358 | 11/1992 |
| EP | 0783986 | 7/1997 |
| GB | 2230237 | 10/1990 |
| GB | 2284184 | 5/1995 |

* cited by examiner

Primary Examiner—Paul N. Dickson
Assistant Examiner—David R. Dunn
(74) Attorney, Agent, or Firm—Robert M. Sigler (57) ABSTRACT

A vehicle roll control system has a torsion bar and a first arm extending substantially perpendicular to the torsion bar. The first arm is fixed to the torsion bar at one end and connectable to one of the axles at the other end. A hydraulic actuator is attached to the torsion bar; and a control connected to the hydraulic actuator controls the operation thereof on detection of a predetermined vehicle condition. The hydraulic actuator comprises a housing, a piston making a sealing sliding fit inside the housing to define a first fluid chamber and a second fluid chamber, and a piston rod connected to the piston and extending through the second fluid chamber and out of the housing. The control acts on detection of the predetermined vehicle condition either to apply substantially the same fluid pressure to the first and second fluid chambers when the piston tends to move in a first direction to extend the hydraulic actuator or to apply a fluid pressure to the second fluid chamber above the fluid pressure in the first fluid chamber when the piston tends to move in a second direction to compress the hydraulic actuator. The first fluid chamber is fluidly connected to a fluid reservoir by the control when the piston tends to move in the second direction, and the control comprises a fluid pump and a directional valve, the pump being fluidly connected to the second fluid chamber and the directional valve being capable of moving between a first position in which the first fluid chamber and the second fluid chamber are fluidly connected, and a second position in which the first fluid chamber is fluidly connected to the fluid reservoir.

5 Claims, 9 Drawing Sheets

VEHICLE ROLL CONTROL SYSTEM

RELATED APPLICATIONS

This application is related to applications U.S. Ser. No. 09/721,446, Vehicle Roll Control System, and U.S. Ser. No. 09/721,443, Hydraulic Actuator for a Vehicle Roll Actuator for Vehicle Roll Control System, both filed on the same day as this application and assigned to the same assignee.

TECHNICAL FIELD

The present invention relates to a roll control system for a motor vehicle.

BACKGROUND OF THE INVENTION

GB-A-2230237 discloses a roll control system comprising a torsion bar, a first arm fixedly connected to one end of the torsion bar, and a second arm rotatably connected to the other end of the torsion bar by way of a rotary actuator. The rotary actuator is operable to effect relative angular movement between the second arm and the said other end of the torsion bar. This arrangement is such that the actuator has to generate a large amount of force in order to provide the required roll control.

GB-A-2284184 describes a roll control system in which a hydraulic cylinder is used to prevent or allow rotation of an arm attached to a torsion bar between the torsion bar and an axle of a wheel. This arrangement provides a limited amount of roll control.

EP-A-0783986 describes an arrangement which is similar in layout to GB-A-2284184 but in which the hydraulic actuators are powered to provided active roll control for the vehicle. EP-A-0512358 describes a twin-axle roll control system which makes use of an attitude sensor for controlling roll.

SUMMARY OF THE INVENTION

The vehicle roll control system of this invention comprises a torsion bar, a first arm attached to the torsion bar at one end of the first arm and connectable to one of the axles at the other end of the first arm, a hydraulic actuator attached to the torsion bar, and control means connected to the hydraulic actuator and controlling the operation thereof on detection of a predetermined vehicle condition. The hydraulic actuator comprises a housing, a piston making a sealing sliding fit inside the housing to define a first fluid chamber and a second fluid chamber, and a piston rod connected to the piston and extending through the second fluid chamber and out of the housing. The control means acts on detection of the predetermined vehicle condition alternatively: (1) to apply substantially the same fluid pressure to the first and second fluid chambers when the piston tends to move in a first direction to extend the hydraulic actuator or (2) to apply a fluid pressure to the second fluid chamber above the fluid pressure in the first fluid chamber when the piston tends to move in a second direction to compress the hydraulic actuator. The first fluid chamber is fluidly connected to a fluid reservoir by the control means when the piston tends to move in the second direction, and the control means comprises a fluid pump and a directional valve. The pump is fluidly connected to the second fluid chamber, and the directional valve is capable of moving between a first position in which the first fluid chamber and the second fluid chamber are fluidly connected and a second position in which the first fluid chamber is fluidly connected to the fluid reservoir. The arrangement provides a roll control system with reduced hydraulic fluid flow and/or improved ride comfort.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
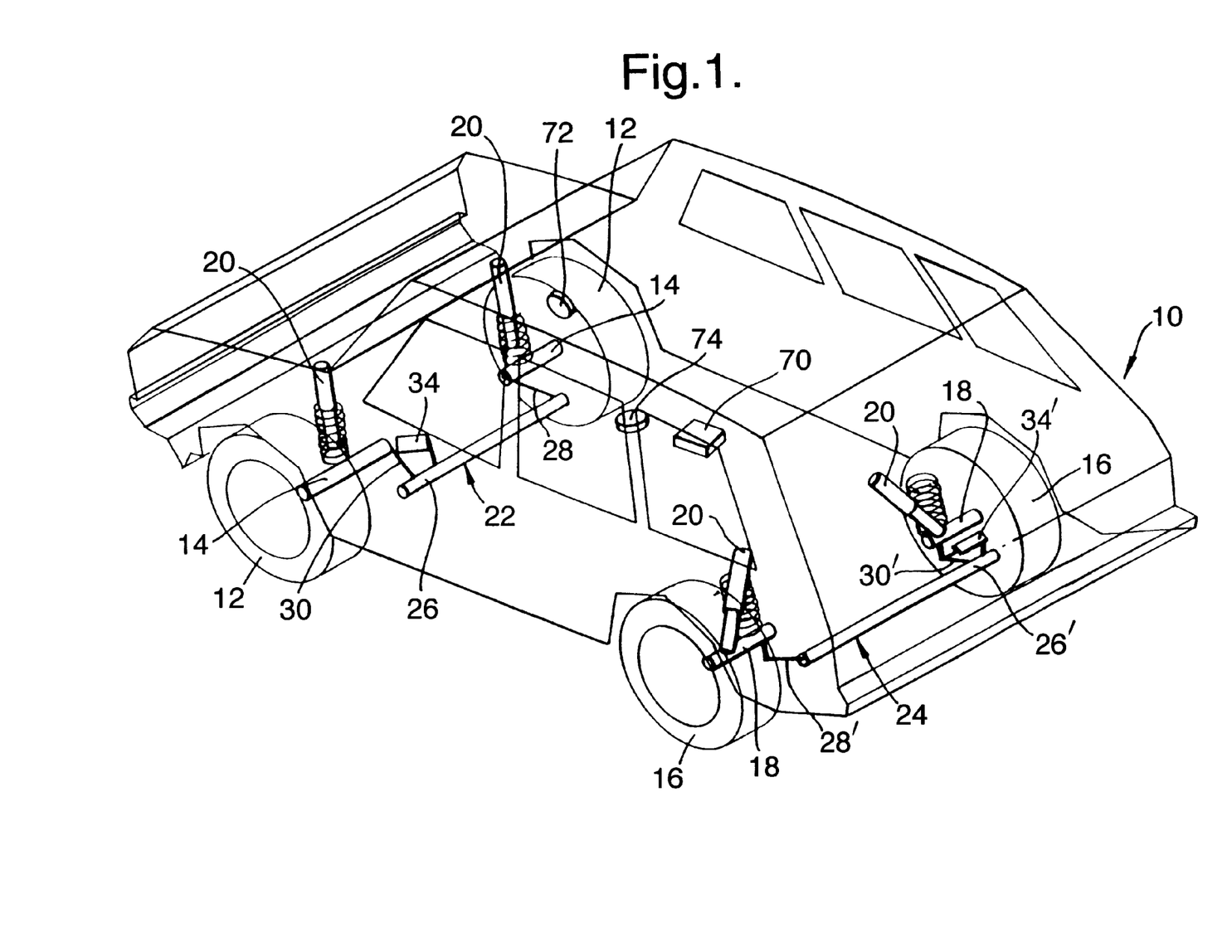
FIG. 1 is a schematic presentation of a vehicle incorporating a vehicle roll control system in accordance with the present invention.
Figure 2:
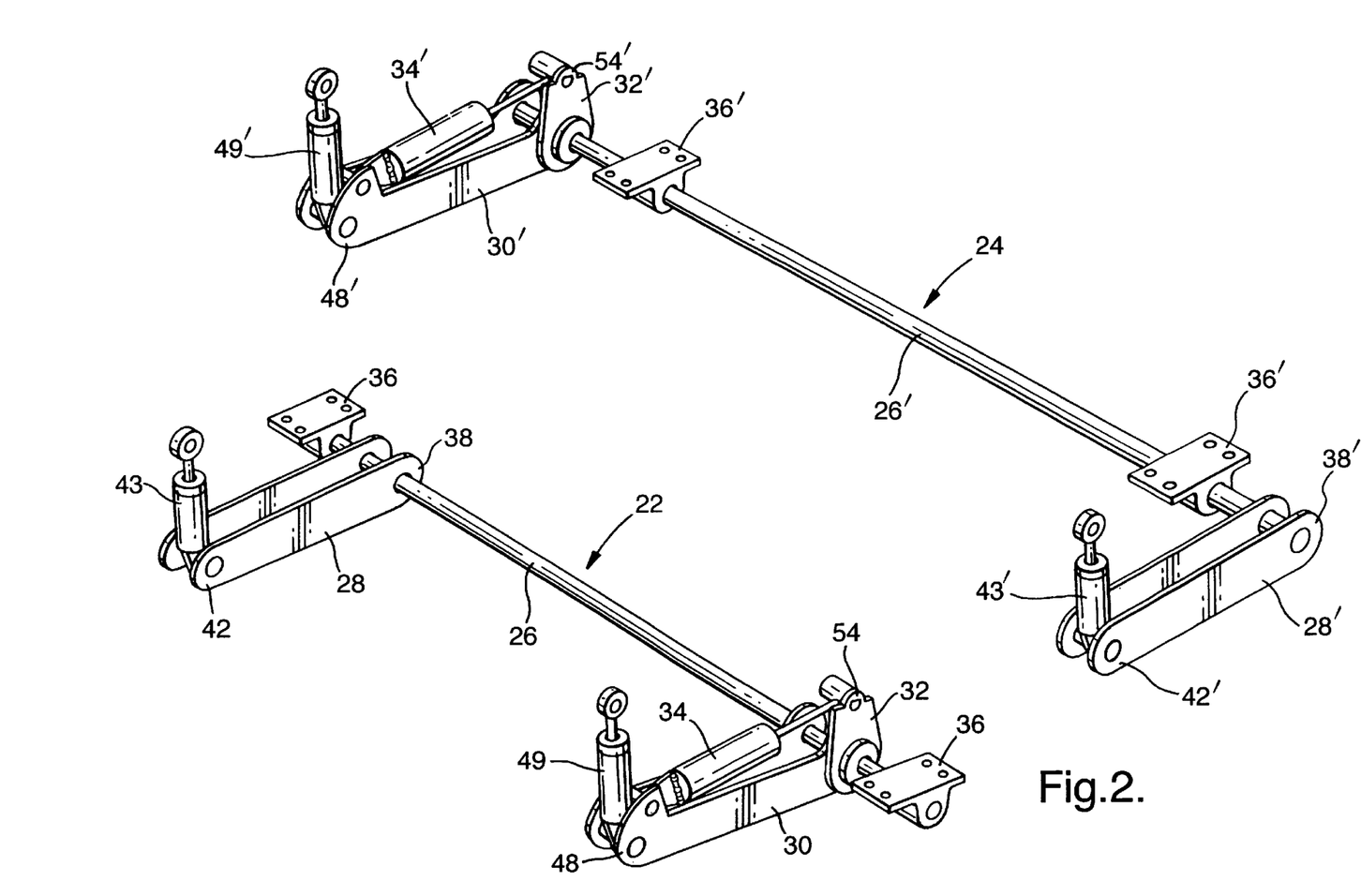
FIG. 2 is an enlarged view of the front and rear portions of the vehicle roll control system shown in FIG. 1.
Figure 3:
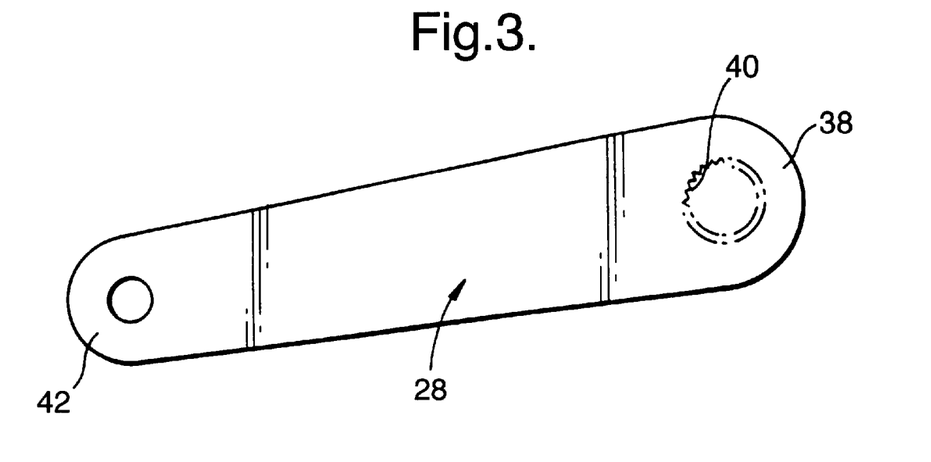
FIG. 3 is a side view of the first arm of the vehicle roll control system shown in FIG. 2.

Referring to FIG. 1, a vehicle 10 is shown schematically and comprises a pair of front wheels 12 each rotatably mounted on an axle 14, a pair of rear wheels 16 each rotatably mounted on an axle 18, and a shock absorbing system 20 associated with each wheel. A portion 22 of a vehicle roll control system in accordance with the present invention is associated with the front wheels 12, and a portion 24 of the vehicle roll control system in accordance with the present invention is associated with the rear wheels 16. The portions 22, 24 are substantially the same but with modifications made solely to allow fitting to the vehicle 10.

Referring in more detail to FIGS. 2 to 6, the portion 22 of the vehicle roll control system for the front of the vehicle comprises a torsion bar 26, a first arm 28, a second arm 30, a lever arm 32, and a hydraulic actuator 34. The torsion bar 26 is mounted on the vehicle by a pair of resilient mounts 36 in conventional manner to extend longitudinally between the wheels 12. The first arm 28 (FIG. 3) is fixed at one end 38 by a splined connection 40 to the torsion bar 26. The other end 42 of the first arm 28 is connected to the axle 14 of one of the front wheels 12 by a tie rod 43. The second arm 30 (FIG. 4) is rotatably mounted at one end 44 on the torsion bar 26 by way of a bearing 46. The other end 48 of the second arm 30 is connected to the axle 14 of the other front wheel 12 by a tie rod 49. The first and second arms 28,30 extend substantially parallel to one another when the vehicle is stationary, and substantially perpendicular to the torsion bar 26.

Figure 4:
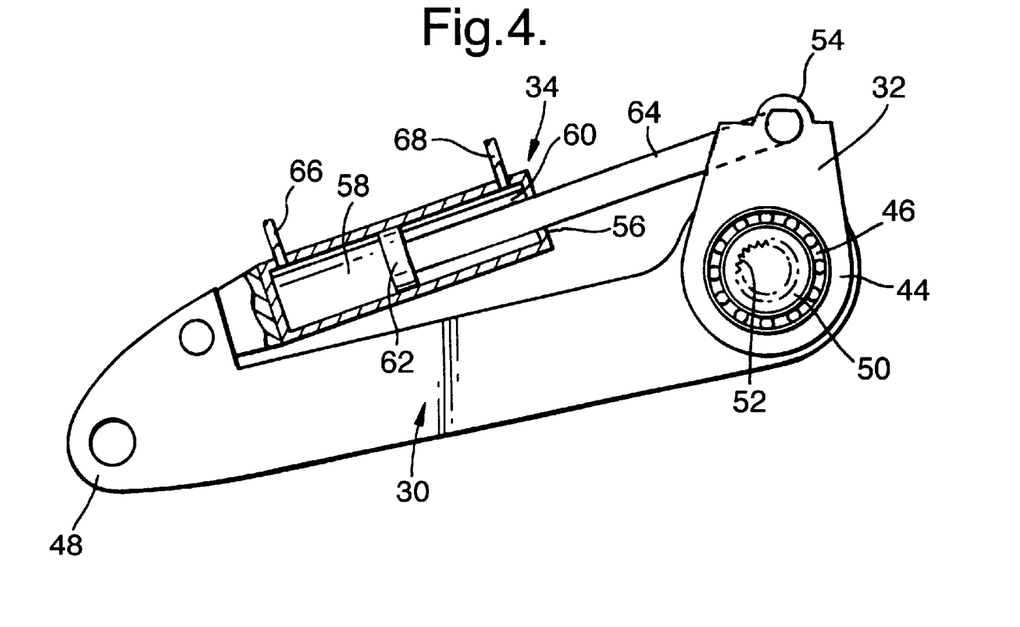
FIG. 4 is a side view of the second arm, hydraulic actuator (shown in cross-section) and lever arm of the vehicle roll control system shown in FIG. 2.

The lever arm 32 (FIG. 4) is fixed at one end 50 to the torsion bar 26 by a splined connection 52 substantially adjacent the one end 44 of the second arm 30 and the bearing 46. The lever arm 32 extends substantially perpendicular to the torsion bar 26 to a free end 54. The hydraulic actuator 34 (FIG. 4) extends between, and is connected to, the free end 54 of the lever arm 32 and the other end 48 of the second arm 30. The hydraulic actuator 34 comprises a housing 56 which defines first and second fluid chambers 58,60 separated by a piston 62 which makes a sealing sliding fit with the housing. As shown in FIG. 4, the housing 56 is connected to the other end 48 of the second arm 30, and the piston 62 is connected to the free end 54 of the lever arm 34 by a piston rod 64 which extends through the second fluid chamber 60. It will be appreciated that these connections may be reversed. The fluid chambers 58,60 contain hydraulic fluid and are fluidly connected to fluid lines 66, 68 respectively. The portion 24 of the vehicle roll control for the rear of the vehicle is substantially the same, but with the components (which are primed) having a different layout.

Figure 5:
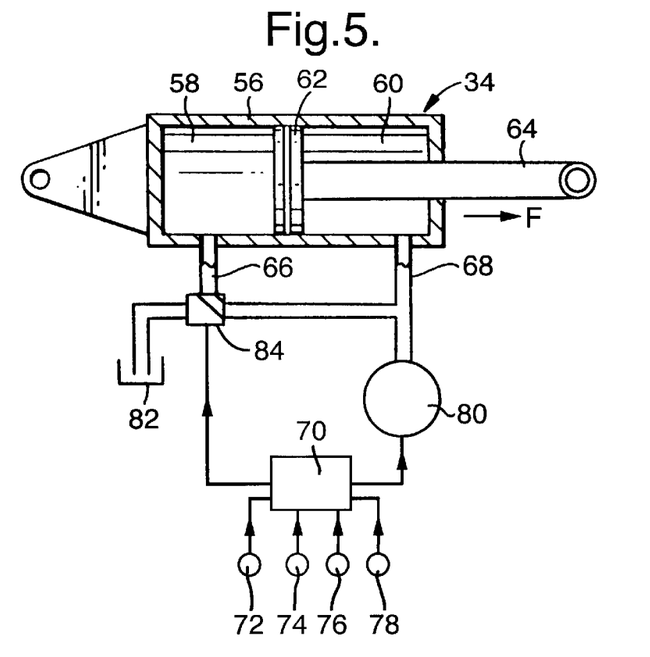
FIG. 5 is a schematic diagram of the hydraulic and electrical control circuit of the vehicle roll control system shown in FIG. 1 when the piston of the hydraulic actuator is moving in one direction.
Figure 6:
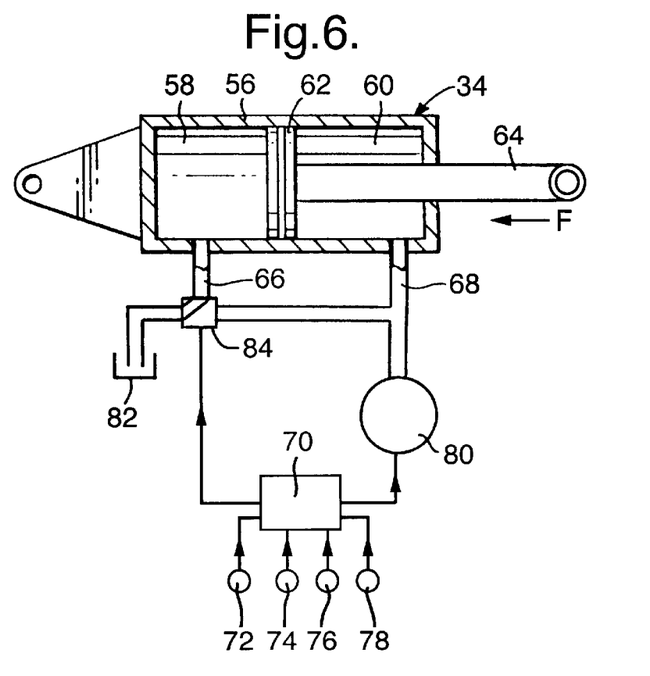
FIG. 6 is a schematic diagram of the hydraulic and electrical control circuit of the vehicle roll control system shown in FIG. 1 when the piston of the hydraulic actuator is moving in the other direction.

The hydraulic and electrical control circuit of the vehicle roll control system is shown in FIGS. 5 and 6. The hydraulic circuit includes a fluid pump 80, a fluid reservoir 82, and a directional valve 84. The fluid line 66, and hence the first fluid chamber 58, is connected to the directional valve 84. The fluid line 68, and hence the second fluid chamber 60, is connected to the fluid pump 80. The directional valve 84 is connected to the fluid pump 80 and to the reservoir 82. The directional valve 84 is operable between a first position (FIG. 5) in which the fluid pump 80 is connected to the first fluid chamber 58, and the reservoir 82 is isolated; and a second position (FIG. 6) in which the first fluid chamber is connected to the reservoir, and the fluid pump is isolated.

The electrical control circuit includes an electronic and/or computerised control module 70. The control module 70 operates the fluid pump 80 and the directional valve 84 when required. The control module 70 operates the pump 80 and the valve 84 dependent on predetermined vehicle conditions which are determined by signals from one or more sensors, such as a pressure sensor 76 (which detects the presence of fluid pressure in the hydraulic circuit), a lateral g sensor 74 (which monitors the sideways acceleration of the vehicle), a steering sensor 72 (which monitors the steering angle of the front wheels 12), a vehicle speed sensor 78, and/or any other relevant parameter.

If the control module 70 detects that roll control is not required (that is, the vehicle is travelling in a straight line), the control module switches off the pump 80. Fluid can freely flow within the hydraulic system including between the two fluid chambers 58,60, of each hydraulic actuator 34, 34' allowing free movement of the piston 62 relative to the housing 56 thereby allowing free rotation of each second arm 30, 30' relative to its associated torsion bar 26, 26'.

If the control module 70 detects that roll control is required (due, for example, to cornering of the motor vehicle 10), the control module determines if the motion will generate a force F which acts on the piston rod 64 to extend the actuator 34, or to compress the actuator, in an axial direction. If the former case, the control module 70 actuates the pump 80 and sets the directional valve 84 in the first position as shown in FIG. 5, so that the same fluid pressure is generated in each of the fluid chambers 58,60. If the latter case, the control module 70 actuates the pump 80 and sets the directional valve 84 in the second position as shown in FIG. 6, so that the fluid in the second fluid chamber 60 is pressurised, but the first fluid chamber 58 is connected to the reservoir 82. By restricting connection of the first fluid chamber 58 to the reservoir 82 only during compression of the actuator 34, the amount of fluid flow within the hydraulic circuit is reduced during roll control. By suitable dimensions for the actuator 34, the output force from the actuator can be made substantially the same irrespective of the direction of motion of the piston 62.

Figure 7:
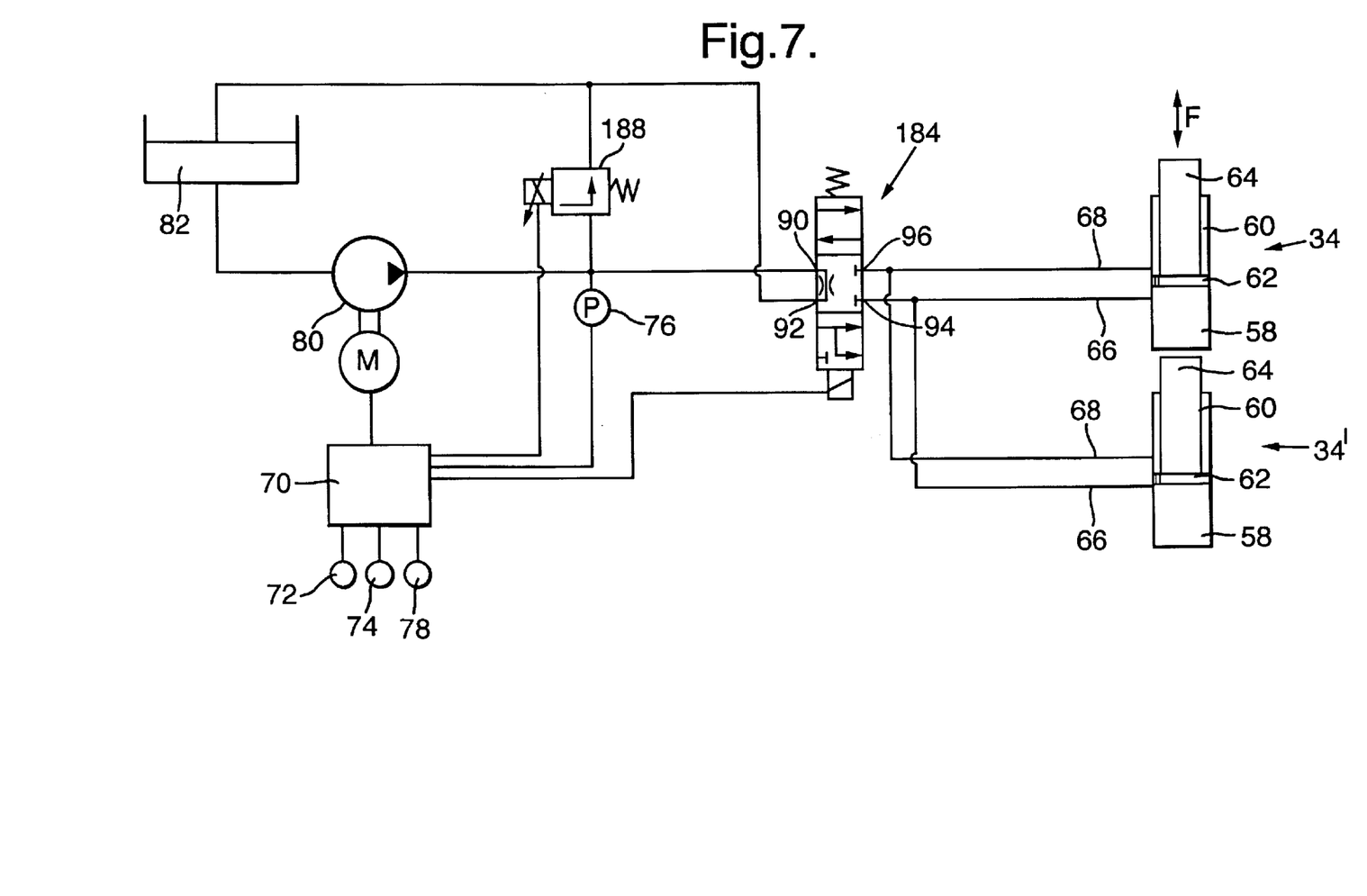
FIG. 7 is a schematic diagram of an alternative embodiment of the hydraulic and electrical control circuit of a vehicle roll control system in accordance with the present invention.

An alternative arrangement for the hydraulic and electrical control circuit is shown in FIG. 7. In this alternative embodiment, the hydraulic circuit includes a fluid pump 80, a fluid reservoir 82, a single directional valve 184, and a pressure control valve 188. The directional valve 184 has a first port 90 fluidly connected to the output of the pump 80, a second port 92 fluidly connected to input to the reservoir 82, a third port 94 fluidly connected to the fluid line 66 and the first fluid chamber 58 of each hydraulic actuator 34,34', and a fourth port 96 fluidly connected to the fluid line 68 and the second fluid chamber 60 of each hydraulic actuator. The directional valve 184 is solenoid actuated and has a de-energised state (shown in FIG. 7) in which the first and second ports 90,92 are fluidly connected and the third and fourth ports 94, 96 are isolated from all the other ports. The directional valve 184 has a first energised or actuated state in which the first port 90 is fluidly connected with the third and fourth ports 94,96, and in which the second port 92 is closed or isolated. The directional valve 184 has a second energised or actuated state in which the first port 90 is fluidly connected with the fourth port 96 and the second port 92 is fluidly connected with the third port 94. The pressure control valve 188 is fluidly connected between the output of the pump 80 and the input of the reservoir 82. In a preferred arrangement, the pump 80 is driven by the vehicle engine and hence continuously actuated, and the pressure control valve 188 is actuated to adjust the fluid pressure in the hydraulic system between a predetermined minimum pressure and a predetermined maximum pressure. Alternatively, the pump 80 may be driven by an electric motor or any other suitable means, either continuously, or variably (in which case the pressure control valve may be omitted).

The electrical control circuit includes an electronic and/or computerised control module 70. The control module 70 operates the fluid pump 80, the directional valve 184, and the pressure control valve 188, when required. The control module 70 actuates the valves 184,188 dependent on predetermined vehicle conditions which are determined by signals from one or more sensors, such as a pressure sensor 76 (which detects the presence of fluid pressure in the hydraulic circuit), a lateral g sensor 74 (which monitors the sideways acceleration of the vehicle), a steering sensor 72 (which monitors the steering angle of the front wheels 12), a vehicle speed sensor 78, and/or any other relevant parameter.

If the control module 70 detects that roll control is not required (that is, the vehicle is travelling in a straight line), the control module actuates the pressure control valve 188 to provide the predetermined minimum pressure, and de-energises the directional valve 184. Fluid can freely flow within the hydraulic system between the pump 80 and the reservoir 82. As the directional valve 184 is closed, the actuators 34,34' are effectively locked.

If the control module 70 detects that roll control is required (due, for example, to cornering of the motor vehicle 10), the control module determines if the motion will generate a force F which acts on the piston rod 64 to extend the actuators 34,34', or to compress the actuators, in an axial direction. If the former case, the control module 70 actuates the pressure control valve 188 to provide a fluid pressure in the hydraulic system which correlates with the force F, and sets the directional valve 184 in the first actuated position, so that the same fluid pressure is generated in each of the fluid chambers 58,60 of each actuator 34,34'. If the latter case, the control module 70 actuates the pressure control valve 188 to provide a fluid pressure in the hydraulic system which correlates with the force F, and sets the directional valve 184 in the second actuated position, so that the fluid in the second fluid chamber 60 of each actuator 34,34' is pressurised, but the first fluid chamber 58 of each actuator is connected to the reservoir 82. By restricting connection of the first fluid chamber 58 of each actuator 34,34' to the reservoir 82 only during compression of the actuators, the amount of fluid flow within the hydraulic circuit is reduced during roll control. By suitable dimensions for the actuators 34,34', the output force from the actuators can be made substantially the same irrespective of the direction of motion of the piston 62.

Figure 8:
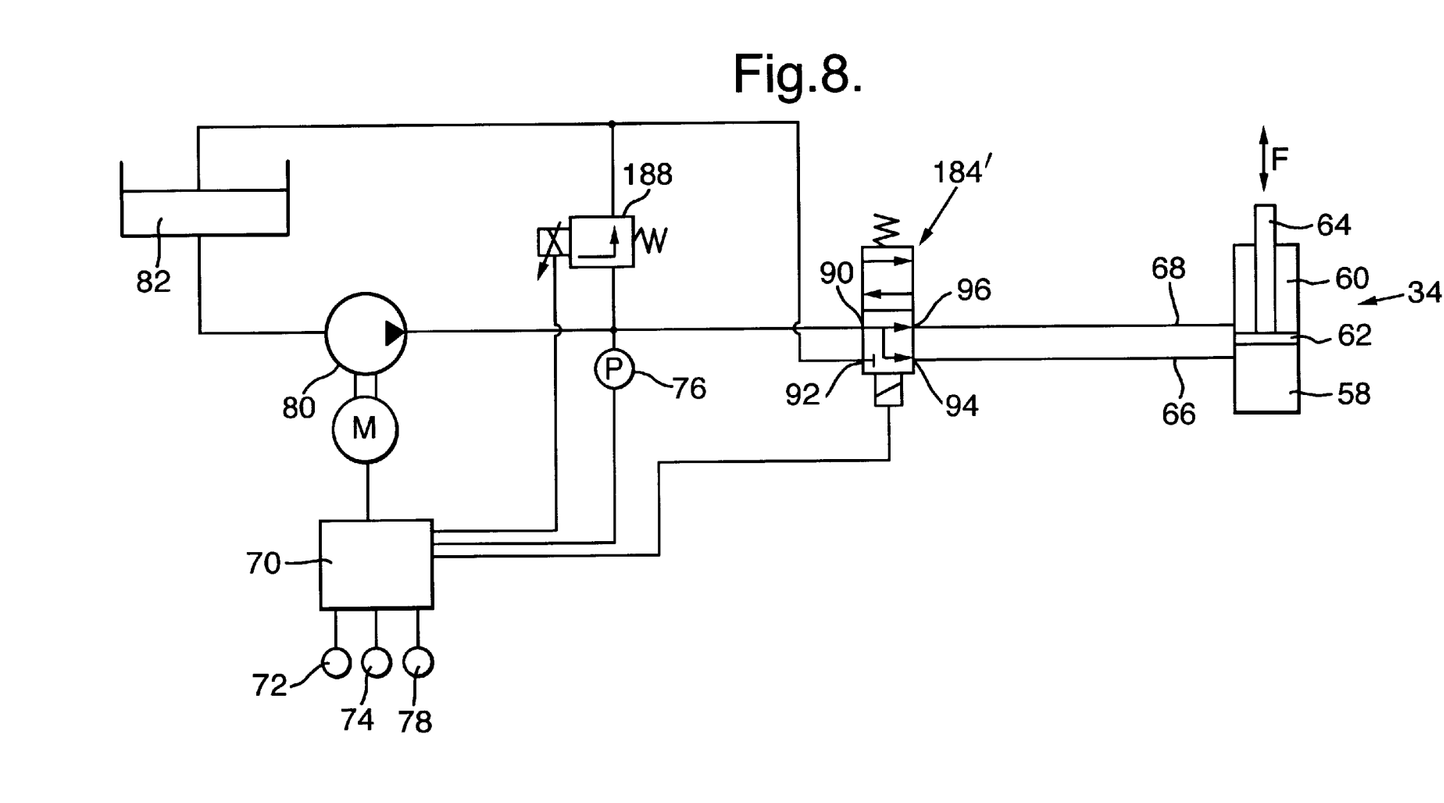
FIG. 8 is a schematic diagram of a further alternative embodiment of the hydraulic and electrical control circuit of a vehicle roll control system in accordance with the present invention.

A further alternative arrangement for the hydraulic and electrical control circuit is shown in FIG. 8. This further alternative embodiment, is a modification of the arrangement shown in FIG. 7, for use with a single hydraulic actuator 34. In this modified arrangement, the single directional valve 184' has a de-actuated state (as shown in FIG. 8) in which the first port 90 is connected to the third and fourth ports 94,96, and the second port is isolated, and an actuated state in which the first port is fluidly connected to the fourth port, and the second port is fluidly connected to the third port. When roll control is not required, the directional valve 184' is de-actuated and the pressure control valve 188 is set to the predetermined minimum pressure, and fluid can freely flow between the fluid chambers 58,60. When roll control is required which requires the actuator 34 to extend in an axial direction, the direction valve 184' is de-actuated and the pressure control valve 188 is set to provide a fluid pressure in the system and in each fluid chamber 58,60 which correlates with the required force F for extension of the actuator. When roll control is required which requires the actuator 34 to compress in an axial direction, the direction valve 184' is actuated and the pressure control valve 188 is set to provide a fluid pressure in the system and in the second fluid chamber 60 (the first fluid chamber 58 is connected with the reservoir 82) which correlates with the required force F for compression of the actuator.

Figure 9:
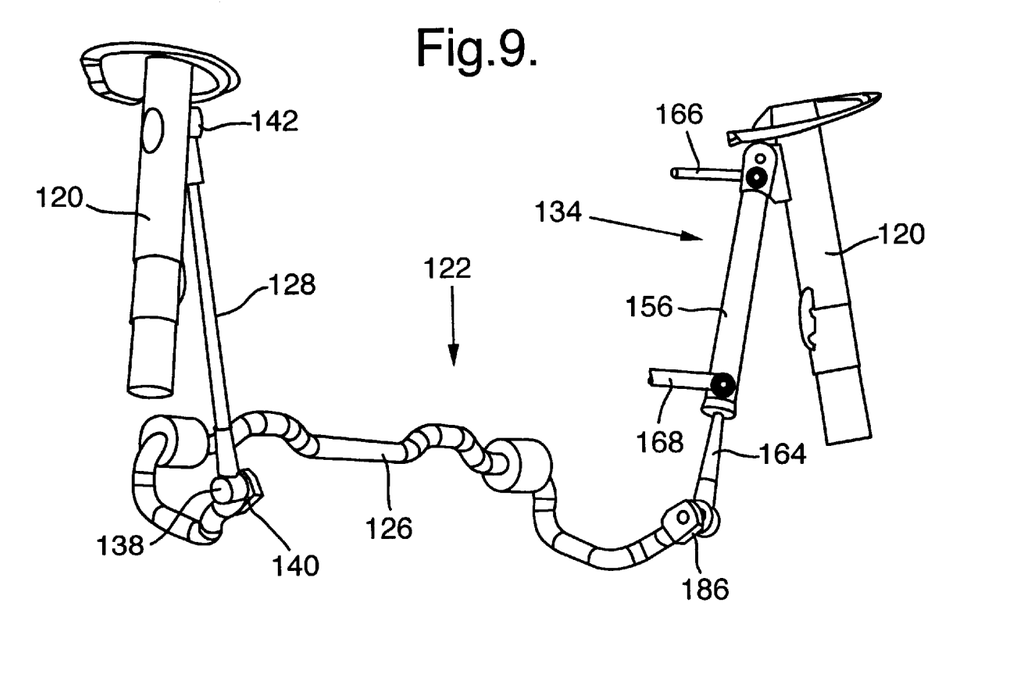
FIG. 9 is a view of a vehicle roll control system in accordance with a second embodiment of the present invention.

The present invention is also applicable for use with a vehicle roll control system as shown in FIG. 9. In this second embodiment in accordance with the present invention, the system 122 comprises a torsion bar 126, a first arm 128, and a hydraulic actuator 134. The first arm 128 is fixed at one end 138 to one end 140 of the torsion bar 126. The other end 142 of the first arm 128 is connected to one of the shock absorbers 120. The hydraulic actuator 134 has a piston rod 164 which is fixed to the other end 186 of the torsion bar 126. The housing 156 of the actuator 134 is connected to the other shock absorber 120. The hydraulic actuator 134 is substantially the same as the actuator 34 described above with reference to FIGS. 1 to 6, and has a fluid line 166 connected to a first fluid chamber inside the housing, and another fluid line 168 connected to a second fluid chamber inside the housing. The first and second fluid chambers inside the housing 156 are separated by a piston secured to the piston rod 164. The fluid lines 166,168 are connected to a hydraulic circuit as shown in FIGS. 5 and 6, which is controlled by a control circuit as shown in FIGS. 5 and 6, or either of the arrangements shown in FIG. 7 or FIG. 8. The roll control system 122 is operated in substantially the same manner as that described above with reference to FIGS. 1 to 6, FIG. 7, or FIG. 8.

Figure 10:
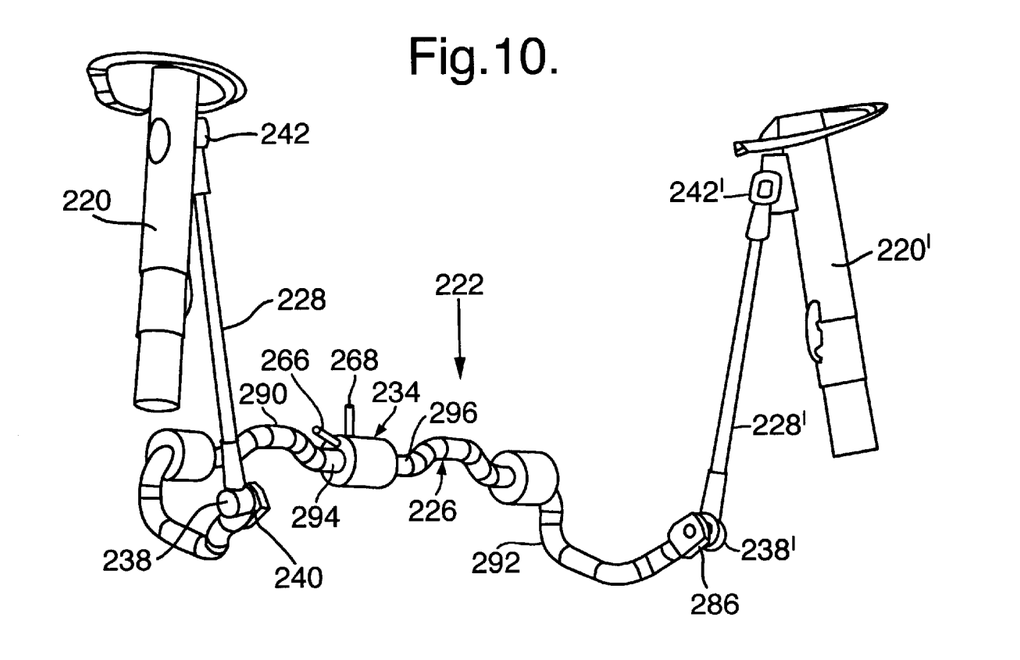
FIG. 10 is a view of a vehicle roll control system in accordance with a third embodiment of the present invention.

The present invention is also applicable for use with a vehicle roll control system as shown in FIG. 10. In this third embodiment in accordance with the present invention, the system 222 comprises a torsion bar 226, a first arm 228, a second arm 228', and a hydraulic actuator 234. The first arm 228 is fixed at one end 238 to one end 240 of the torsion bar 226. The other end 242 of the first arm 228 is connected to one of the shock absorbers 220. The second arm 228' is fixed at one end 238' to the other end 286 of the torsion bar 226. The other end 242' of the second arm 228' is connected to the other shock absorber 220'. The torsion bar 226 is split into first and second parts 290,292, respectively. The first and second parts 290,292 of the torsion bar 226 have portions 294,296, respectively, which are axially aligned. The axially aligned portions 294,296 are connected by a hydraulic actuator 234.

Figure 11:
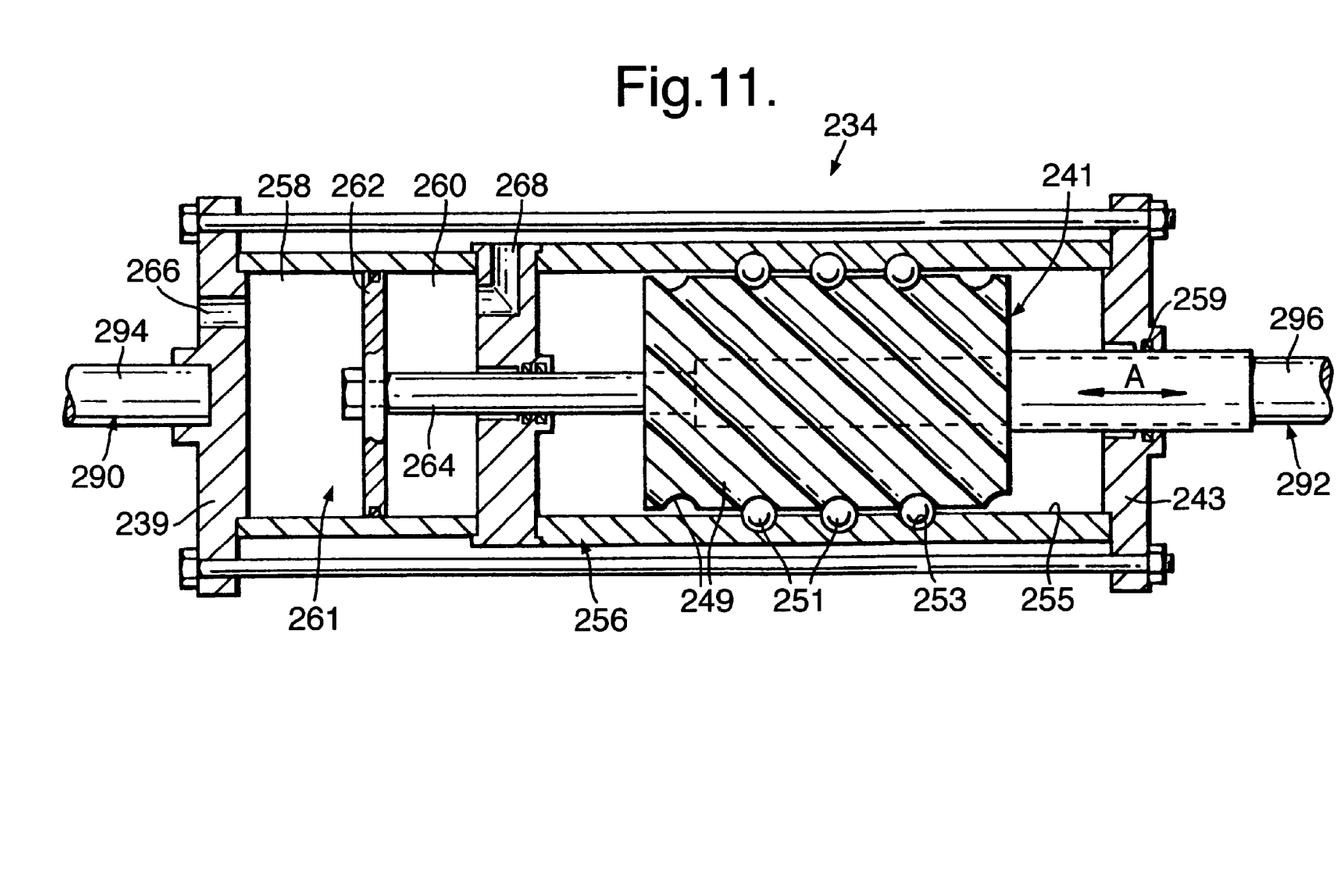
FIG. 11 is a cross-section view of the hydraulic actuator of the vehicle roll control system of FIG. 10.

The hydraulic actuator 234, as shown in FIG. 11, comprises a cylindrical housing 256 which is connected at one end 239 to the portion 294 of the first part 290 of the torsion bar 226. The actuator 234 further comprises a rod 241 positioned inside the housing 256, extending out of the other end 243 of the housing, and connectable to the portion 296 of the second part 292 of the torsion bar 226. The rod 241 has an external screw thread 249 adjacent the housing 256. Balls 251 are rotatably positioned in hemispherical indentations 253 in the inner surface 255 of the housing 256 adjacent the screw thread 249. The balls 251 extend into the screw thread 249. The rod 241 is slidably and rotatably mounted in the housing 256 at the other end 243 by way of a bearing 259 positioned in the other end 243. This arrangement allows the rod 241 to rotate about its longitudinal axis relative to the housing 256, and to slide in an axial direction A relative to the housing. A piston chamber 261 is defined inside the housing 256. The rod 241 sealing extends into the piston chamber 261 to define a piston rod 264, and a piston 262 is secured to the end of the piston rod inside the piston chamber. The piston 262 makes a sealing sliding fit with the housing 256 and divides the chamber 261 into a first fluid chamber 258 and a second fluid chamber 260. The first fluid chamber 258 is fluidly connected to fluid line 266, and the second fluid chamber 260 is fluidly connected to fluid line 268.

The fluid lines 266,268 are connected to a hydraulic circuit as shown in FIGS. 5 and 6, which is controlled by a control circuit as shown in FIGS. 5 and 6, or either of the arrangements shown in FIG. 7 or FIG. 8. The roll control system 222 is operated in substantially the same manner as that described above with reference to FIGS. 1 to 6, FIG. 7, or FIG. 8.

Figure 12:
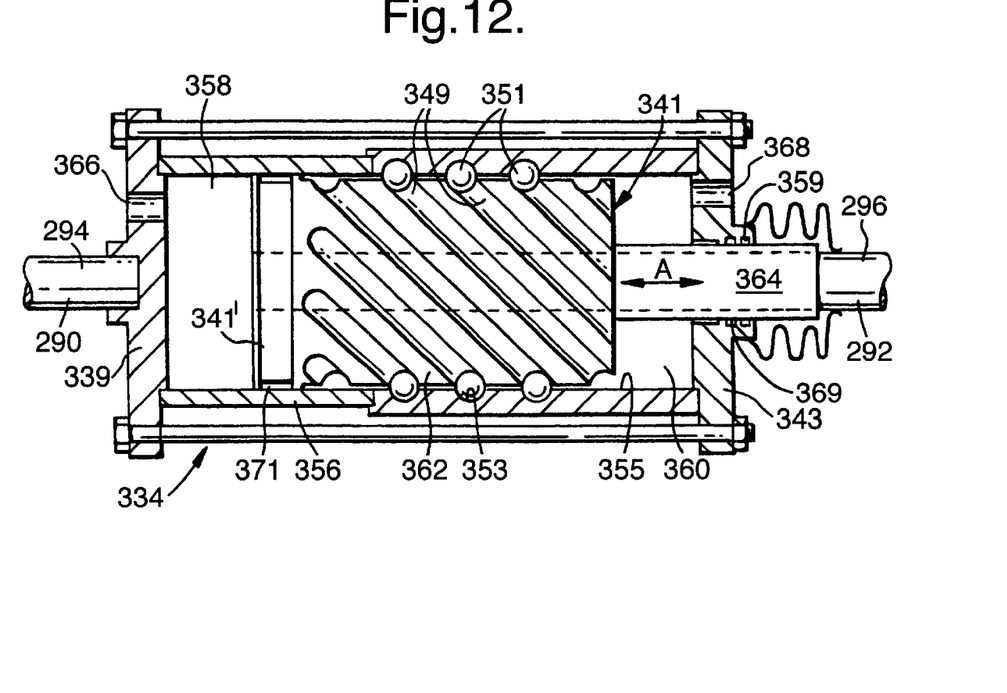
FIG. 12 is a cross-sectional view of an alternative embodiment of hydraulic actuator for the vehicle roll control system of FIG. 10.

An alternative arrangement for the hydraulic actuator of FIG. 11 is shown in FIG. 12. In this alternative embodiment, the actuator 334 comprises a cylindrical housing 356 which is connected at one end 339 to the portion 294 of the first part 290 of the torsion bar 226. The actuator 334 further comprises a rod 341 positioned inside the housing 356, extending out of the other end 343 of the housing, and connectable to the portion 296 of the second part 292 of the torsion bar 226. The rod 341 has an external screw thread 349 adjacent the housing 356. Balls 351 are rotatably positioned in hemispherical indentations 353 in the inner surface 355 of the housing 356 adjacent the screw thread 349. The balls 351 extend into the screw thread 349. The rod 341 is slidably and rotatably mounted in the housing 356 at the other end 343 of the housing by way of a bearing 359 positioned in the other end. The rod 341 makes a sliding guiding fit with the inner surface 355 of the housing 356 at its end 341' remote from the second part 292 of the torsion bar 226. This arrangement allows the rod 341 to rotate about its longitudinal axis relative to the housing 356, and to slide in an axial direction A relative to the housing. First and second fluid chambers 358,360 are defined inside the housing 356. The rod 341 makes a sealing fit with the inner surface 355 of the housing 356 by way of seal 371 to define a piston 362. The first fluid chamber 358 is positioned on one side of the piston 362, and the second fluid chamber 360 is positioned on the other side of the piston. A seal 369 is positioned adjacent the bearing 359. A portion 364 of the rod 341 defines a piston rod which extends through the second fluid chamber 360. The first fluid chamber 358 is fluidly connected to fluid line 366, and the second fluid chamber 360 is fluidly connected to fluid line 368. The fluid lines 366,368 are fluidly connected with one of the hydraulic circuits shown in FIGS. 5 to 8 to actuate the actuator 334.

Figure 13:
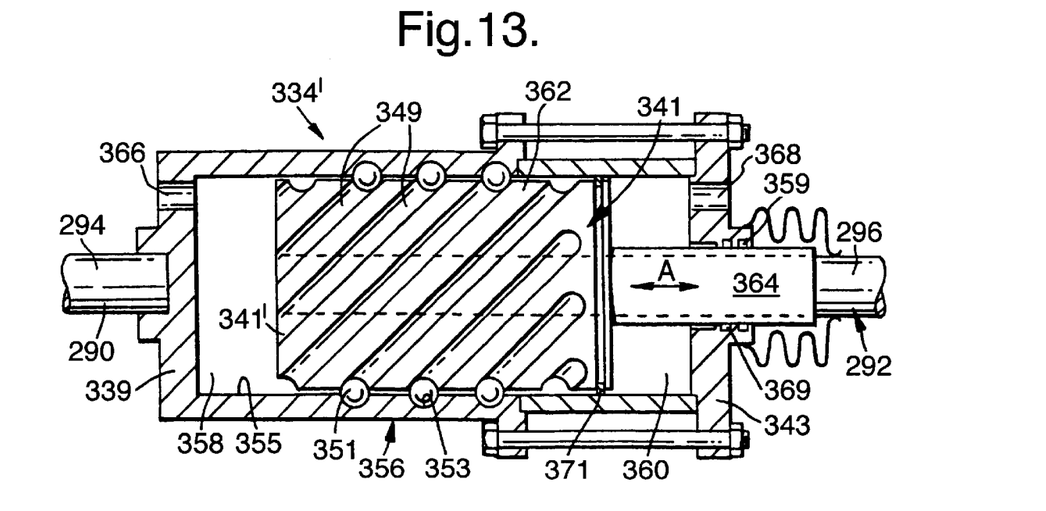
FIG. 13 is a cross-sectional view of a further alternative embodiment of hydraulic actuator for the vehicle roll control system of FIG. 10.

A further alternative arrangement of hydraulic actuator 334' is shown in FIG. 13. In this further alternative embodiment, the actuator 334' is substantially the same as the actuator 334 shown in FIG. 12, but without the sliding guiding fit of the free end 341' of the rod 341 with the housing 356.

In a preferred arrangement, the cross-sectional area of the first fluid chamber of each hydraulic actuator described above is substantially double the cross-sectional area of the piston rod of the hydraulic actuator, when considered on a radial basis. Such an arrangement provides the same output force from the hydraulic actuator in either direction, using the same fluid pressure and equal amounts of fluid.

In the preferred arrangement described above, a hydraulic actuator is provided for both the front of the vehicle and the rear of the vehicle, and these hydraulic actuators are controlled in unison. It will be appreciated that the hydraulic actuators may be controlled individually, and in certain cases the portion of the roll control system at the rear of the vehicle may be omitted. Also, the hydraulic actuator for the front of the vehicle may be a different type to the hydraulic actuator for the rear of the vehicle.

In any of the roll control systems described above, the hydraulic actuator may include a check valve (not shown, but preferably mounted in the piston) which allows flow of hydraulic fluid from the first fluid chamber to the second fluid chamber only when the fluid pressure in the first fluid chamber is greater than the fluid pressure in the second fluid chamber. With such an arrangement, the second fluid chamber can be connected to a reservoir during servicing of the actuator to bleed air from the hydraulic fluid. Also, the presence of the check valve reduces the risk of air being sucked into the second fluid chamber should the fluid pressure in the second fluid chamber fall below the fluid pressure in the first fluid chamber, and provides further improvements in ride comfort.

What is claimed is:

1. A vehicle roll control system for a vehicle having a pair of wheels each rotatable on an axle, the roll control system comprising:

a torsion bar;

a hydraulic actuator connected to selectively exert a torque on the torsion bar in a first direction or a second direction opposite the first direction, the hydraulic actuator comprising a housing, a piston making a sealing sliding fit inside the housing to define a first fluid chamber and a second fluid chamber, and a piston rod connected to the piston and extending through the second fluid chamber and out of the housing, the cross-sectional area of the first fluid chamber being substantially double the cross-sectional area of the piston rod;

a fluid reservoir at essentially atmospheric pressure;

a fluid pump providing an activating fluid pressure greater than atmospheric pressure;

a directional valve, the directional valve having a first position in which the first fluid chamber and the second fluid chamber are fluidly connected to the pump and a second position in which the second fluid chamber is fluidly connected to the pump and the first fluid chamber is fluidly connected to the fluid reservoir; and control means effective upon detection of a predetermined vehicle condition indicating vehicle roll to activate the fluid pump and the directional valve, the directional valve being activated to its first position when the vehicle roll tends to compress the hydraulic actuator, whereby the activating fluid pressure applied to the first and second fluid chambers tends to extend the hydraulic actuator in opposition to such compression, the directional valve being activated to its second position when the vehicle roll tends to extend the hydraulic actuator, whereby the activating fluid pressure applied to the second fluid chamber relative to the atmospheric pressure applied to the first fluid chamber tends to compress the hydraulic actuator in opposition to such extension.

2. A vehicle roll control system as claimed in claim 1, wherein the control means comprises an electronic control module which receives signals dependent on the predetermined vehicle condition, and which controls the operation of the fluid pump and the directional valve.

3. A vehicle roll control system as claimed in claim 2, wherein the hydraulic actuator is attached to the torsion bar at one end of the hydraulic actuator and is connectable to the other axle at the other end of the hydraulic actuator.

4. A vehicle roll control system as claimed in claim 1, wherein the directional valve has a third position in which each of the first chamber and the second chamber are isolated from both the pump and the reservoir and the control means is effective to activate the directional valve to the third position when the predetermined vehicle condition indicating vehicle roll is not detected.

5. A vehicle roll control system for a vehicle having a pair of wheels each rotatable on an axle, the roll control system comprising:

a torsion bar;

a hydraulic actuator connected to selectively exert a torque on the torsion bar in a first direction or a second direction opposite the first direction, the hydraulic actuator comprising a housing, a piston making a sealing sliding fit inside the housing to define a first fluid chamber and a second fluid chamber, and a piston rod connected to the piston and extending through the second fluid chamber and out of the housing, the cross-sectional area of the first fluid chamber being substantially double the cross-sectional area of the piston rod;

a fluid reservoir at essentially atmospheric pressure;

a fluid pump providing an activating fluid pressure greater than atmospheric pressure;

a directional valve, the directional valve having a movable valve member being solenoid activatable in a first direction to a first position in which the first fluid chamber and the second fluid chamber are fluidly connected to the pump and alternatively in a second direction to a second position in which the second fluid chamber is fluidly connected to the pump and the first fluid chamber is fluidly connected to the fluid reservoir; and control means effective upon detection of a predetermined vehicle condition indicating vehicle roll to activate the fluid pump and the directional valve, the directional valve being activated to its first position when the vehicle roll tends to compress the hydraulic actuator, whereby the activating fluid pressure applied to the first and second fluid chambers tends to extend the hydraulic actuator in opposition to such compression, the directional valve being activated to its second position when the vehicle roll tends to extend the hydraulic actuator, whereby the activating fluid pressure applied to the second fluid chamber relative to the atmospheric pressure applied to the first fluid chamber tends to compress the hydraulic actuator in opposition to such extension.

* * * * *